US010788936B1

(12) United States Patent
Jain et al.

(10) Patent No.: US 10,788,936 B1
(45) Date of Patent: Sep. 29, 2020

(54) ABSORPTION CORRECTION FOR FABRIC TOUCH SENSING LAYER

(71) Applicant: Apple Inc., Cupertino, CA (US)

(72) Inventors: Karan Jain, Cupertino, CA (US); Nandita Venugopal, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/036,766

(22) Filed: Jul. 16, 2018

Related U.S. Application Data

(60) Provisional application No. 62/533,578, filed on Jul. 17, 2017.

(51) Int. Cl.
G06F 3/041 (2006.01)
B32B 5/26 (2006.01)
G06F 3/044 (2006.01)
G06F 3/0488 (2013.01)

(52) U.S. Cl.
CPC .............. G06F 3/0418 (2013.01); B32B 5/26 (2013.01); G06F 3/044 (2013.01); G06F 3/04886 (2013.01)

(58) Field of Classification Search
CPC .... G06F 3/017; G06F 3/0304; G06F 3/04883; G06F 3/02; G06F 3/0221; G06F 3/023; G06F 3/038; G06F 3/0418; G06F 3/0481; G06F 3/044; G06F 3/0488; G06F 19/00; G06F 2203/04102; G06F 1/163; D03D 1/0082; D03D 1/0088; D03D 2700/0166
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Dong Hui Liang
(74) *Attorney, Agent, or Firm* — Kubota & Basol LLP

(57) ABSTRACT

Fabric touch-sensitive layers provided for electronic devices can absorb moisture, liquids or chemicals, which can cause drift in measurements of touch nodes formed in the fabric layer. In some examples, reference nodes formed in a fabric layer can be used to account for drift due to the absorption of moisture, liquids or chemicals. The reference nodes can be isolated from the effects of proximate or touching objects and from absorption of moisture, liquids or chemicals. The reference nodes can also be formed in a fabric layer having the same or similar properties as the fabric touch-sensitive layers. When measurements of touch nodes drift due to changes in absorption, the measurements can be adjusted based on measurements of reference nodes.

24 Claims, 6 Drawing Sheets

(56) References Cited

U.S. PATENT DOCUMENTS

| | | |
|---|---|---|
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,230,610 B2 | 6/2007 | Jung et al. |
| 7,663,607 B2 | 2/2010 | Hotelling et al. |
| 8,479,122 B2 | 7/2013 | Hotelling et al. |
| 8,836,647 B2 | 9/2014 | Alexander |
| 9,448,631 B2 | 9/2016 | Winter et al. |
| 10,082,913 B2* | 9/2018 | Moller .................. G06F 3/044 |
| 2005/0069695 A1* | 3/2005 | Jung .................. D03D 1/0088 428/328 |
| 2006/0197753 A1 | 9/2006 | Hotelling |
| 2011/0241907 A1* | 10/2011 | Cordeiro ............... G06F 3/0418 341/20 |
| 2012/0256875 A1* | 10/2012 | Ho ....................... G06F 3/0418 345/174 |
| 2015/0234108 A1 | 8/2015 | Harley, Jr. |
| 2015/0280708 A1* | 10/2015 | Goto ..................... H03K 17/98 341/33 |
| 2016/0048235 A1* | 2/2016 | Poupyrev ............... G06F 3/044 345/174 |
| 2016/0049266 A1* | 2/2016 | Stringer ............... H01H 13/704 200/5 A |
| 2016/0124531 A1* | 5/2016 | Marwah ................ G06F 1/1643 345/173 |
| 2017/0075481 A1 | 3/2017 | Chou et al. |
| 2019/0051473 A1* | 2/2019 | Peterson ............... G06F 3/0202 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

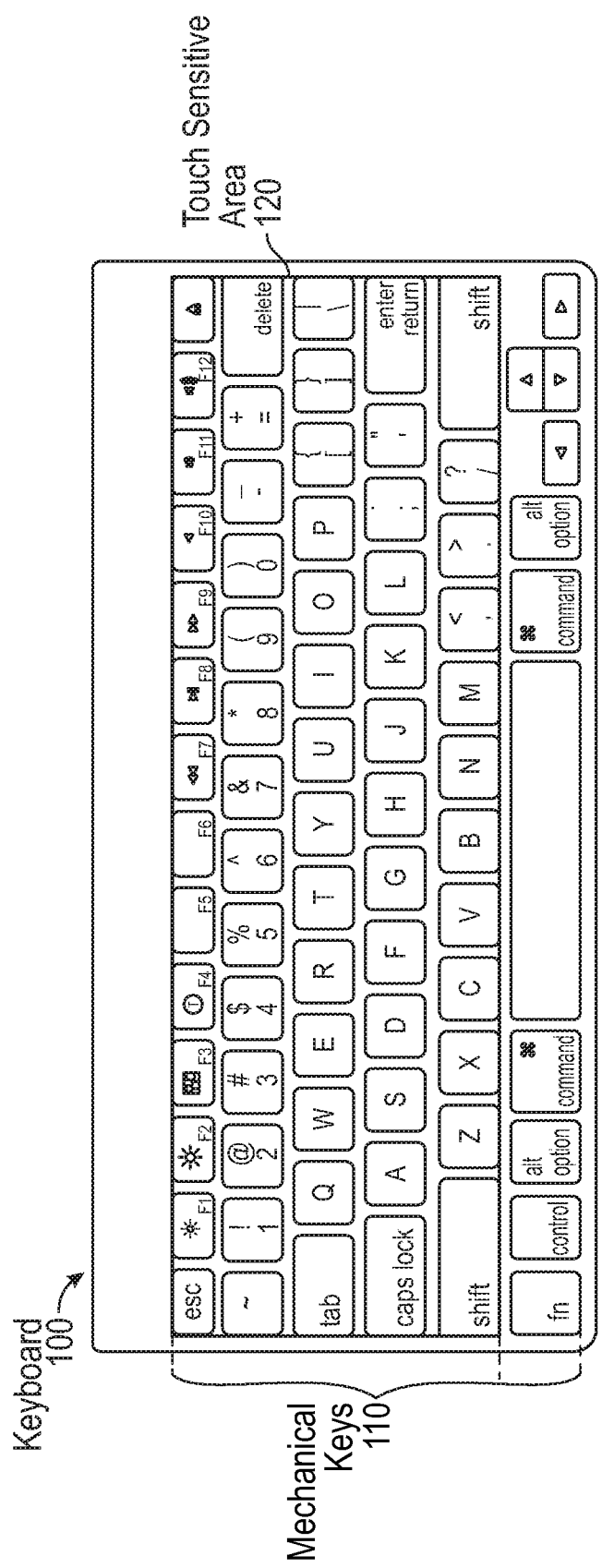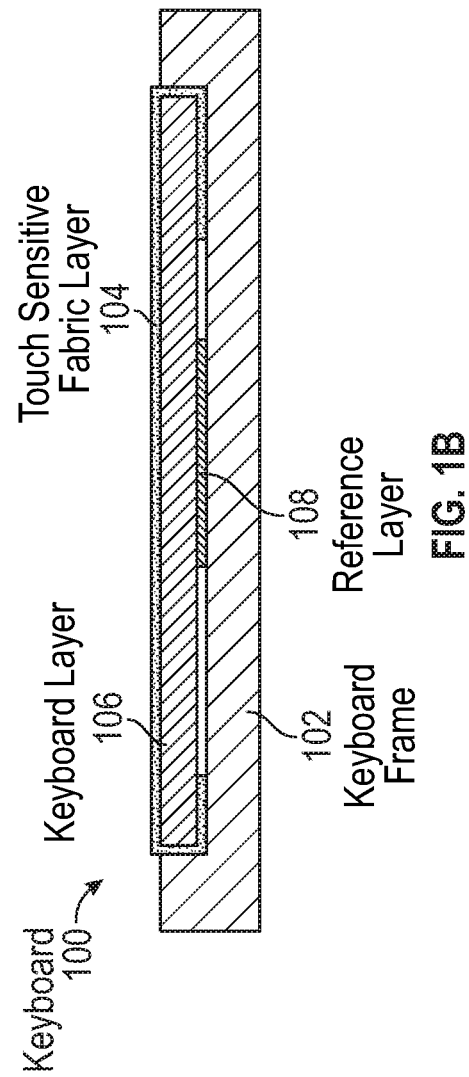
FIG. 1A
FIG. 1B

FIG. 6C

ABSORPTION CORRECTION FOR FABRIC TOUCH SENSING LAYER

CROSS-REFERENCE TO RELATED APPLICATIONS

This application claims benefit of U.S. Provisional Patent Application No. 62/533,578, filed Jul. 17, 2017, which is hereby incorporated by reference in its entirety.

FIELD OF THE DISCLOSURE

This relates generally to the calibration of touch-sensitive input devices for computing systems, and more particularly, to absorption correction for touch-sensitive input devices including a fabric touch sensing layer.

BACKGROUND OF THE DISCLOSURE

Keyboards are widely used to provide textual input to a computing system and to control the operation of the computer. These keyboards typically have rectangular or near-rectangular mechanical buttons or keys arranged in the so-called QWERTY layout. The keys can be configured to move independently of one another and comply with standards for key spacing and actuation force.

For example, a "dome-switch" keyboard can include keys, which when depressed, can push down on and collapse a rubber dome sitting beneath the key. The rubber dome can collapse, which can give tactile feedback to the user depressing the key, and can cause a conductive contact on the underside of the dome to touch a pair of conductive lines on a Printed Circuit Board (PCB) below the dome, thereby closing the switch. A chip in the keyboard can emit a scanning signal along pairs of lines on the PCB to all the keys. When the signal in one pair of the lines changes due to the closing of the switch, the chip can generate a code corresponding to the key connected to that pair of lines. This code can be sent to the computer either through a keyboard cable or over a wireless connection where it can be received and decoded into the appropriate key. The computer then can process the input from the keyboard to perform some action (e.g., display a character on the screen). Other types of keyboards can operate in a similar manner, with the main difference being how the individual key switches work. Some examples of other keyboards include capacitive-switch keyboards, mechanical-switch keyboards, Hall-effect keyboards, membrane keyboards, roll-up keyboards, and so on.

There have been numerous attempts made to introduce alternative keyboards. The changes include, but are not limited to, non-QWERTY layouts, concave and convex surfaces, capacitive keys, split designs, membrane keys, etc. However, while such alternative keyboards may provide improved usability or ergonomics, they have failed to replace or duplicate the commercial success of the conventional mechanical keyboard.

SUMMARY OF THE DISCLOSURE

This relates to absorption correction for devices including a fabric touch-sensing layer. Fabric touch-sensitive layers provided for electronic devices can absorb moisture, liquids or chemicals, which can cause drift in measurements of touch nodes formed in the fabric layer. In some examples, reference nodes formed in a fabric layer can be used to account for drift due to the absorption of moisture, liquids or chemicals. The reference nodes can be isolated from the effects of proximate or touching objects and from absorption of moisture, liquids or chemicals. The reference nodes can also be formed in a fabric layer having the same or similar properties as the fabric touch-sensitive layers. When measurements of touch nodes drift due to changes in humidity, or the presence of liquids or chemicals, the measurements can be adjusted based on measurements of reference nodes.

BRIEF DESCRIPTION OF THE DRAWINGS

FIG. 1A illustrates an exemplary touch-sensitive input device, such as a touch-sensitive mechanical keyboard, according to examples of the disclosure.

FIG. 1B illustrates an exemplary simplified cross-sectional side view of an exemplary input device according to examples of the disclosure.

FIG. 6A illustrates an initial calibration process for touch nodes and reference nodes according to examples of the disclosure.

FIGS. 6B and 6C illustrate a recalibration process for touch nodes and reference nodes according to examples of the disclosure.

DETAILED DESCRIPTION

Figure 1C:
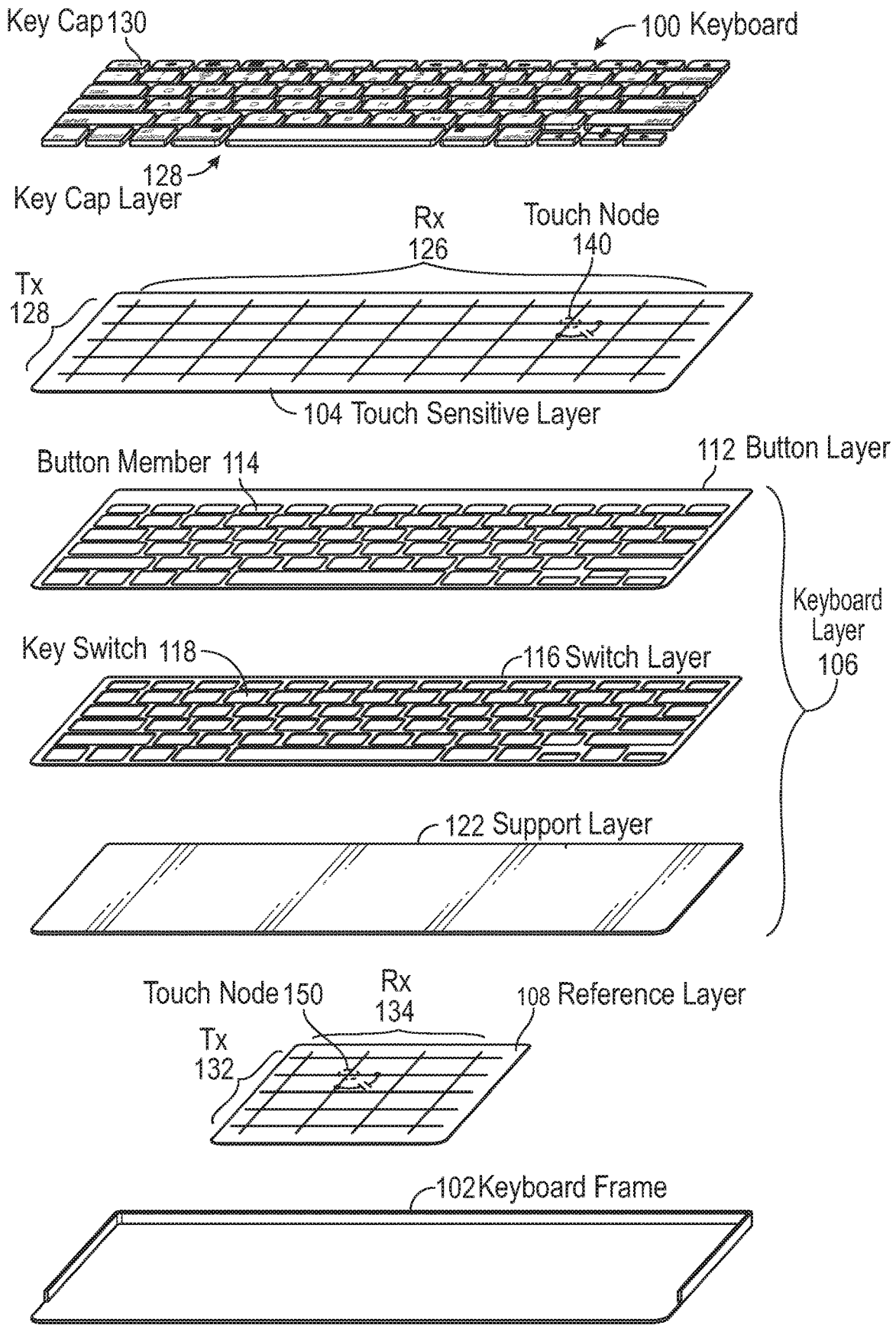
FIG. 1C illustrates an exploded view of an exemplary input device according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to absorption correction for devices including a fabric touch-sensing layer. Fabric touch-sensitive layers provided for electronic devices can absorb moisture, liquids or chemicals, which can cause drift in measurements of touch nodes formed in the fabric layer. In some examples, reference nodes formed in a fabric layer can be used to account for drift due to the absorption of moisture, liquids or chemicals. The reference nodes can be isolated from the effects of proximate or touching objects and from absorption of moisture, liquids or chemicals. The reference nodes can also be formed in a fabric layer having the same or similar properties as the fabric touch-sensitive layers. When measurements of touch nodes drift due to changes in humidity, or the presence of liquids or chemicals, the measurements can be adjusted based on measurements of reference nodes.

FIG. 1A illustrates an exemplary touch-sensitive input device, touch-sensitive mechanical keyboard 100, according to examples of the disclosure. It should be understood that although generally described and illustrated herein as a keyboard, examples of the disclosure are not limited to mechanical keyboards, but are additionally applicable to any touch sensing device employing fabric touch-sensitive layers. Mechanical keyboard 100 or other touch sensing device can be part of or used as a peripheral device with a tablet computer, laptop computer, a desktop computer, a display, a cellular telephone, a media player, a wristwatch device or other wearable electronic equipment, headphones, an accessory such as a cover or other enclosure for an electronic device such as a tablet computer or other portable device, equipment embedded in a larger system, electronic equipment associated with furniture or a vehicle, equipment in a building, or other suitable electronic device.

Touch-sensitive mechanical keyboard 100 can include mechanical keys 110 arranged, for example, in a conventional QWERTY arrangement. Touch-sensitive mechanical keyboard 100 can also include an array of touch sensors (touch nodes) to detect objects touching or proximate to the surface of keyboard 100 without mechanically activating keys 110. The touch sensors (touch nodes) are described in more detail below. As used herein in the context of a device with mechanical keys, "touch-sensitive" and "proximity-sensitive" refer to the ability to detect touching or hovering objects without mechanical activation of the keys 110. The array of touch sensors can be disposed in keyboard 100 to provide a touch-sensitive area and/or a proximity-sensitive area over a portion of or all of a surface of keyboard 100. For example, FIG. 1A illustrates a touch-sensitive area 120 corresponding to the surface of keyboard 100 including mechanical keys 110, but covering only five of the six rows of mechanical keys 110 (excluding the bottom-most row). In some examples, touch-sensitive area 120 can span all mechanical keys 110 and/or the surface of keyboard 100 including mechanical keys, even in locations without mechanical keys. In some examples, the touch-sensitive area 120 can span other surfaces of keyboard 100 that do not include mechanical keys 110 (e.g., external surfaces of keyboard 100 not illustrated in FIG. 1A). By integrating object touch and proximity detection and tracking capability into keyboard 100 without altering its overall appearance or, more importantly, the familiar way in which it is used for typing, most of the benefits of a gesture-based input capability can be realized without negatively impacting the user's text entry experience. Cursor input functions, such as point, click, scroll, drag, select and zoom, for example, can be enabled with keyboard 100 such that the user can invoke these functions without moving the user's hands off keyboard 100. These functions, and more, can be driven by hand/finger motion while the fingers are sliding over and touching keys 110 of keyboard 100.

In some examples, keyboard 100 can operate in two (or more) distinct modes including, for example, a typing mode and a touch and/or proximity detection mode. While in typing mode, objects detected touching and/or hovering over keyboard 100 can be ignored, but actuation of mechanical keys 110 can be used to provide keyboard input, such as to provide alphanumeric character input. Ignoring or forgoing touch and proximity detection can prevent unintended input (e.g., cursor moving, page scrolling, or screen zooming) as the user moves fingers while typing. Modifier keys, hot keys, and function keys can also provide expected input when actuated during typing mode. In other words, keyboard 100 can function as a conventional mechanical keyboard when in typing mode.

In touch and/or proximity detection mode, typing, for the most part, can be disabled. Touch sensing circuitry can detect and/or track the objects in contact with or proximate to keyboard 100 in order to provide gesture input (e.g., cursor input, scrolling, dragging or zooming).

Separating the function of keyboard 100 into two or more distinct modes that a user deliberately invokes can prevent or reduce unintended behavior caused by accidental touch in a typing mode, or accidental actuation of keys in a touch and/or proximity detection mode. In this manner, the operation of keyboard 100 can respond properly to intended user input because the user informs keyboard 100 of the user's intent by switching modes. Mode switching can be implemented in various ways. In some examples, mode switching can be implemented in ways that do not require the user to look down at keyboard 100, thereby improving the user experience. In one example, a dedicated key can be provided to switch into the touch and/or force detection mode. In some examples, the touch and/or force detection mode can be maintained while the dedicated key remains actuated. In some examples, the dedicated key can comprise a "sticky" key, such that a tap of the dedicated key switches between modes. In some examples, the modes can be switched when the user concurrently taps or holds an arbitrary combination of the keys (e.g., actuation of three keys or four keys). In some examples, the arbitrary combination of the keys can be restricted to adjacent keys in order to affect the mode switch. In some examples, the way to exit a mode can be different than the way to enter the mode (or more generally different transitions between modes can be different). For example, four adjacent keys can be used switch from a typing mode to a touch and/or proximity detection mode, and a dedicated key (e.g., space bar, escape key) can be used to switch back to the typing mode.

Although separate modes are described above, in some examples, multiple inputs can be simultaneously enabled. For example, actuation of keys can trigger typing input and touch and/or proximity gestures can be detected simultaneously.

FIG. 1B illustrates an exemplary simplified cross-sectional side view of an exemplary input device according to examples of the disclosure. Keyboard 100 can have housing structures formed from plastic, metal, glass, ceramic, carbon fiber composites, fiberglass, and other fiber composites, fabric and other intertwined strands of material, and/or other materials. In the example of FIG. 1B, for example, keyboard 100 can include components that are mounted within a housing body formed from a lower housing layer, keyboard frame 102, and an upper housing layer, touch-sensitive layer 104. Keyboard frame 102 can be formed from plastic, plastic with embedded microfibers, or other suitable materials. Touch-sensitive layer 104 can be formed from fabric. The fabric of touch-sensitive layer 104 can include strands of conductive material that have been intertwined (without making electrical connections) using weaving techniques, knitting techniques, braiding techniques, or other techniques for intertwining strands of material. Touch-sensitive layer 104 can include, for example, an array of capacitive touch nodes to detect touch and/or proximity, though other touch detection technologies may be used. The keyboard layer 106 can include an array of keys, each key including a movable button member (e.g., key cap) and an associated key switch (e.g., dome switch, butterfly switch, etc.). Keyboard layer 106 can be disposed between the keyboard frame 102 and the touch-sensitive layer 104, such that the fabric of the touch-sensitive layer 104 covers the array of keys in keyboard layer 106.

Fabric can provide a comfortable surface with localized touch movement which can be desirable for keyboards in particular. Unlike glass or plastic surfaces, however, touch nodes of a fabric touch-sensitive layer can be susceptible to drift. For example, fabric can absorb moisture or liquids due to ambient conditions or human touch, which in turn can change dielectric properties of the fabric and thereby the response of the touch nodes. For example, sweat, cosmetics or lotions from fingers can be absorbed by a fabric. Additionally, moisture, liquids or chemicals from a variety of sources (e.g., changes in humidity) may be absorbed by the fabric. As a result, touch (and/or proximity) sensing performance can be degraded by uneven touch detection and/or by false detection of touches or gestures. For example, a contact from a single object (e.g., a thumb) can split into two detected contacts, contacts from two different objects can merge into one detected contact, a hovering object can be detected as touching the surface, or a touching object can be detected as hovering. As described in more detail herein, reference nodes can be used to recalibrate touch nodes to account for drift. In some examples, as illustrated in FIG. 1B, reference nodes 108 can also be disposed between the keyboard frame 102 and keyboard layer 106. In some examples, reference nodes 108 can be disposed in the fabric of touch-sensitive layer 104.

FIG. 1C illustrates an exploded view of an exemplary input device according to examples of the disclosure. Keyboard 100 can include a keyboard frame 102, a touch-sensitive layer 104, a keyboard layer 106 and a reference layer 108, as described above with reference to FIG. 1B. Keyboard layer 106 can include a button layer 112 including a plurality of movable button members 114, a switch layer 116 including a plurality of key switches 118, and support layer 122 (e.g., a PCB). In some examples, as illustrated in FIG. 1C, a key cap layer 128 including keycaps 130 can be added and disposed over fabric touch-sensitive layer 104 corresponding to button members 114 on button layer 112, so that keys of keyboard 100 can have a similar feel to conventional keyboards. In some examples, key cap layer 128 can be omitted and fabric touch-sensitive layer 104 can form an external surface of keyboard 100 (e.g., as illustrated in FIG. 1B).

Touch-sensitive layer 104 can be a fabric layer formed of strands of conductive and non-conductive material that have been intertwined using weaving techniques, knitting techniques, braiding techniques, or other techniques for intertwining strands of material. Touch-sensitive layer 104 can include a capacitive sensing medium having a plurality of drive electrodes 124 (labeled Tx) and a plurality of sense electrodes 126 (labeled Rx). The drive and sense electrodes can be formed from a transparent or non-transparent conductive material (e.g., copper) included in the fabric (but not electrically connected to one another). The drive and sense electrodes can be separated from each other by at least a nonconductive portion of the fabric, which forms a dielectric between the drive and sense electrodes. Each adjacency of drive and sense electrodes can represent a capacitive sensing node or touch node 140, which can be particularly useful when the array of touch nodes 140 of the fabric touch-sensitive layer 104 is viewed as capturing an "image" of touch or proximity. The capacitance between the drive and sense electrodes and local system ground can appear as a stray capacitance Cstray, and the capacitance at the intersections of the drive and sense electrodes, i.e., the touch nodes, can appear as a mutual signal capacitance Csig between the drive and sense electrodes when the given drive electrode is stimulated with an alternating current (AC) signal. The presence of a finger or other object (such as a stylus) near or on the touch sensor panel can be detected by measuring changes to a signal charge present at the nodes being touched, which can be a function of Csig. In some examples, the touch sensitive layer can use self-capacitance touch sensing nodes, as described in more detail below.

Reference layer 108 can also be a fabric layer formed of strands of conductive and non-conductive material that have been intertwined using weaving techniques, knitting techniques, braiding techniques, or other techniques for intertwining strands of material. Reference layer 108 can include a capacitive sensing medium having a plurality of drive electrodes 132 (labeled Tx) and a plurality of sense electrodes 136 (labeled Rx). The drive and sense electrodes can be formed from a transparent or non-transparent conductive material (e.g., copper) included in the fabric (but not electrically connected to one another). The drive and sense electrodes can separated from each other by nonconductive portions of the fabric, which forms a dielectric between the drive and sense electrodes. Each adjacency of drive and sense electrodes can represent a capacitive sensing node or reference node 150. In some examples, the reference layer can use self-capacitance touch sensing nodes.

Figure 2A:
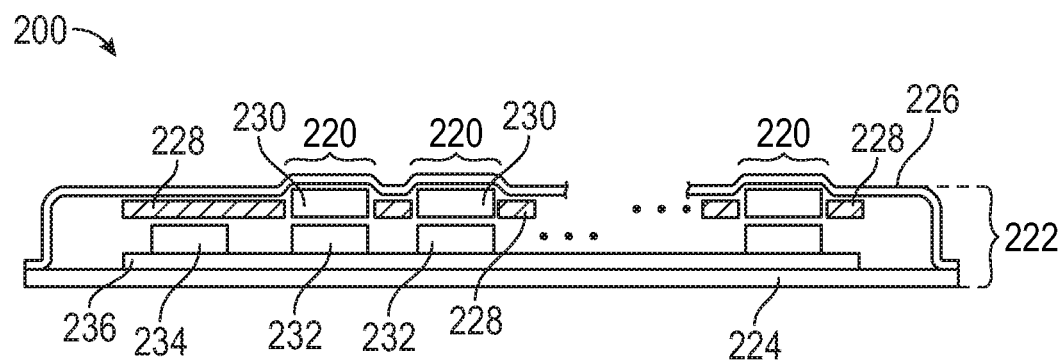
FIGS. 2A and 2B illustrate exemplary cross-sectional side views of an electronic device according to examples of the disclosure.
Figure 2B:
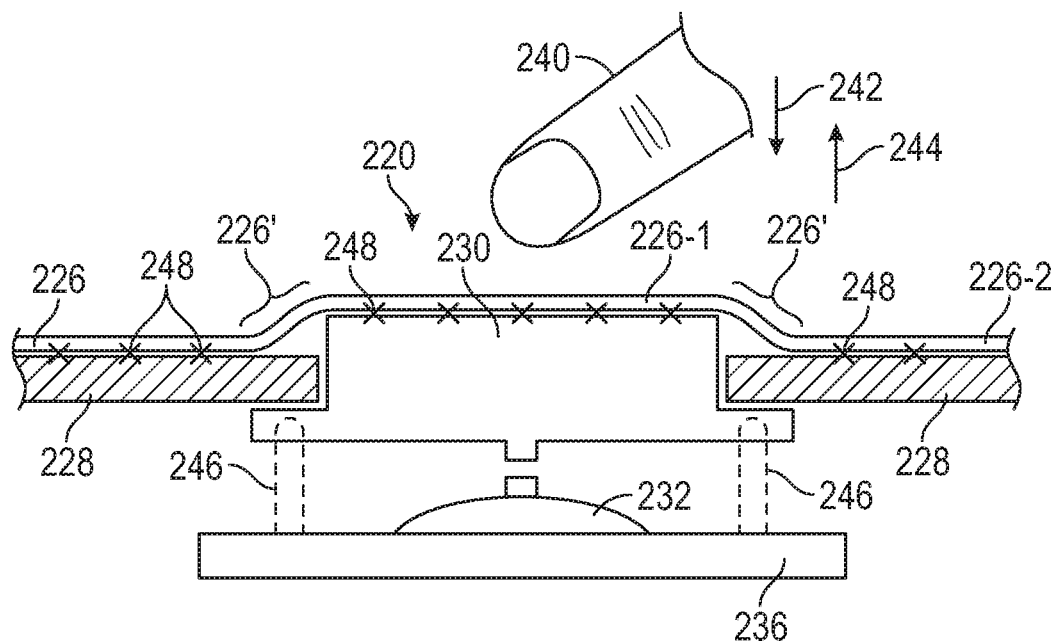

FIGS. 2A and 2B illustrate exemplary cross-sectional side views of an electronic device according to examples of the disclosure. In the example of FIG. 2A, electronic device 200 can be a cover (or part of a cover) for a tablet computer or other electronic equipment. Electronic device 200 can include housing structures formed from plastic, metal, glass, ceramic, carbon fiber composites, fiberglass, and other fiber composites, fabric and other intertwined strands of material, and/or other materials. As an example, electronic device 200 can include components mounted within a housing body formed from lower housing layer 224 and upper housing layer 226. Lower housing layer 224 can be formed from plastic, plastic with embedded microfibers, or other materials. Upper housing layer 226 can be formed from fabric. The fabric of upper housing layer 226 can include strands of conductive and non-conductive material intertwined using weaving techniques, knitting techniques, braiding techniques, or other techniques for intertwining strands of material. The strands of conductive material in the fabric can be electrically separated from one another by non-conductive portions of the fabric. The strands of material in the fabric of layer 226 can be polymer strands, metal strands, glass strands, strands of material that include a core of one material (e.g., polymer) coated with one or more additional materials (e.g., a metal layer, a dielectric outer coating, etc.). The strands of material in layer 226 can be monofilaments or multi-filament strands (sometimes referred to as yarn or thread).

Device 200 can include a keyboard (e.g., a computer keyboard for an associated tablet computer, laptop computer, or other computing equipment). The keyboard can include an array of keys 220 covered by fabric layer 226. Each key 220 can include a movable button member such as key cap 230 and an associated switch such as key switch 232. Key caps 230 can be mounted in openings in a support structure such as key web 228 (e.g., a plastic panel with rectangular openings and other openings configured to receive respective key caps 230 or other button members). Key web 228 can supply structural support for fabric layer 226 and can therefore form an internal frame for the upper housing wall of device 200. Key switches 232 can be mounted on substrate 236. Substrate 236 can be a printed circuit board that contains metal traces for forming signal paths to interconnect support circuitry 234 (e.g., one or more integrated circuits) with key switches 232.

As illustrated in FIG. 2B, key cap 230 can be aligned with key switch 232 so that key switch 232 can be actuated when an object (e.g., finger 240) presses downwards in direction 242 on the key 220 formed from key cap 230 and switch 232. Switch 232 can be a dome switch or other switch mounted on printed circuit board 236. Support structures 246 (e.g., a butterfly mechanism or other hinge mechanism) can be used to provide support for key cap 230 and to provide a restoring force that biases key cap 230 upwards in direction 244 when the user releases key 220. Fabric layer 226 can be attached to the upper surface of device 200 and can cover key web 228 and the upper surfaces of key caps 230 in keys 220. Adhesive 248, injection-molded portions of key web 228, or other suitable attachment mechanisms can be used to attach portion 226-2 of fabric layer 226 to key web 228. Adhesive 248 and/or other attachment mechanisms can also be used to attach portion 226-1 of fabric layer 226 to key caps 230, or alternatively portions 226-1 can be free of adhesive 248. The key cap in each key can be surrounded by peripheral portions 226' of fabric layer 226. If, for example, key caps 230 are rectangular, peripheral portions 226' can have the shape of rectangular rings. The peripheral boundary portion 226' of fabric layer 226 that surrounds each key 220 can be preferably sufficiently flexible to allow key caps 230 to travel freely both in outwards direction 244 and inwards direction 242 during use of the keyboard by a user.

Fabric 226 can be formed from intertwined strands of conductive and non-conductive material using weaving equipment (to form woven fabric), knitting equipment (to form knitted fabric), braiding equipment (to form braided fabric), or using other strand intertwining equipment (e.g., equipment for forming felt). Any suitable fabric construction can be used for fabric 226. In one suitable configuration, for example, fabric 226 can be woven fabric. Woven fabric can have a plain weave, a basket weave, or other suitable types of weave.

Figure 3:
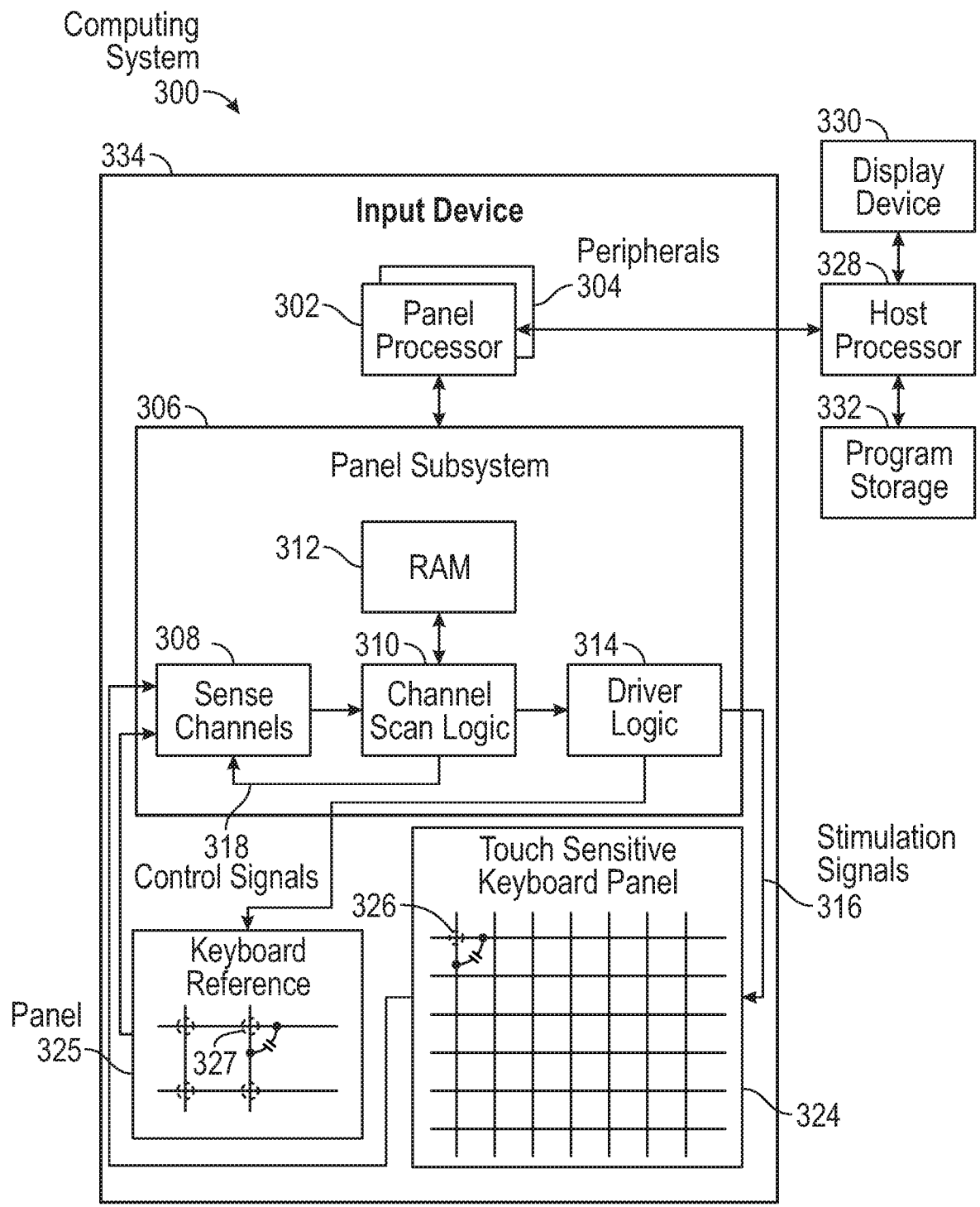
FIG. 3 illustrates an exemplary computing system including a touch-sensitive mechanical keyboard according to examples of the disclosure.

FIG. 3 illustrates an exemplary computing system including a touch-sensitive mechanical keyboard according to examples of the disclosure. Computing system 300 can include input device 334, which can correspond to a touch-sensitive mechanical keyboard such as keyboard 100 described above. Input device 334 can include a touch sensing system including one or more panel processors 302, peripherals 304 and panel subsystem 306. Peripherals 304 can include, but are not limited to, random access memory (RAM) or other types of memory or storage, watchdog timers and the like. Panel subsystem 306 can include, but is not limited to, one or more sense channels 308, channel scan logic (analog or digital) 310 and driver logic (analog or digital) 314. Channel scan logic 310 can access RAM 312, autonomously read data from the sense channels 308 and provide control signals 318 for the sense channels 308. In addition, channel scan logic 310 can control driver logic 314 to generate stimulation signals 316 that can be selectively applied (e.g., sequentially or simultaneously) to drive lines of touch-sensitive keyboard panel 324 and to drive lines of touch-sensitive keyboard reference panel 325, which can correspond to fabric touch-sensitive layer 104, 226 and reference layer 108, respectively, as described above. Panel processor 302 can process the data received from scanning the touch sensor keyboard panel 324 and/or the touch-sensitive keyboard reference panel 325. In some examples, panel processor 302 can calibrate touch nodes of the touch sensor keyboard panel 324 as described herein. In some embodiments, panel subsystem 306, panel processor 302 and peripherals 304 can be integrated into a single application specific integrated circuit (ASIC) that can be referred to herein as a touch controller.

Touch-sensitive keyboard panel 324 can be embedded within a conductive fabric disposed over a mechanical keyboard, and can include a capacitive sensing medium having a plurality of drive lines and a plurality of sense lines, although other sensing configurations can also be used. Each intersection or adjacency of drive and sense lines can represent a touch node and can be viewed as picture element (pixel) 326, which can be particularly useful when touch-sensitive keyboard panel 324 is viewed as capturing an "image" of touch for the array of touch nodes 326. (In other words, after panel subsystem 306 has determined whether a touching (or hovering) object has been detected at each touch node in the touch-sensitive keyboard panel, the pattern of touch nodes in the touch-sensitive keyboard panel at which touch (or hover) occurred can be viewed as an "image" of touch (e.g. a pattern of fingers touching or hovering over the panel). Each drive line of the touch sensor panel 324 can be driven by driver logic 314. Each sense line of touch sensor panel 324 can be sensed by sense channels 308 in panel subsystem 306. For example, the capacitance between the drive and sense electrodes and local system ground can appear as a stray capacitance Cstray, and the capacitance at the touch nodes can appear as a mutual signal capacitance Csig between the drive and sense electrodes when the given drive electrode is stimulated with an alternating current (AC) signal. The presence of a finger or other object (such as a stylus) near or on the touch sensor panel can be detected by measuring changes to a signal charge present at the nodes being touched, which can be a function of Csig.

Touch-sensitive keyboard reference panel 325 can similarly be embedded within a conductive fabric disposed over a mechanical keyboard, and can include a capacitive sensing medium having one or more drive lines and one or more sense lines, although other sensing configurations can also be used. Each intersection or adjacency of drive and sense lines can represent a reference node. Each drive line of reference sensor panel 325 can be driven by driver logic 314. Each sense line of reference sensor panel 325 can be sensed by sense channels 308 in panel subsystem 306. For example, the capacitance between the drive and sense electrodes and local system ground can appear as a stray capacitance Cstray, and the capacitance at the reference nodes can appear as a mutual signal capacitance Csig between the drive and sense electrodes when the given drive electrode is stimulated with an alternating current (AC) signal. The reference node(s) can be isolated from objects touching or hovering over the input device, such that the measured mutual capacitance signal can be representative of a sensor measurement in a no-touch condition.

Although illustrated in FIG. 3 as a mutual capacitance based touch-sensitive keyboard panel and touch-sensitive keyboard reference panel including an array of drive electrodes and sense electrodes, it should be understood that touch nodes 326 and reference nodes 327 could be implement with self-capacitance electrodes. In some self-capacitance sensing examples, the touch-sensitive keyboard panel 324 can include a matrix of small plates of conductive material that can be referred to as a touch node. In some examples, a touch-sensitive keyboard panel 324 can include a plurality of individual touch nodes, each touch node identifying or representing a unique location on the touch screen at which touch or proximity (hovering) can be sensed, and each touch node being electrically isolated from the other touch nodes in the touch-sensitive keyboard panel 324. During self-capacitance operation, a touch node can be stimulated with an AC waveform, and the self-capacitance to ground of the touch node can be measured. As an object approaches the touch node, the self-capacitance to ground of the touch node can change. This change in the self-capacitance of the touch node can be detected and measured by the touch sensing system to determine the positions of multiple objects when they touch, or come in proximity to, the touch sensor panel. Each touch node 326 can be coupled to a sense channel 208 in panel subsystem 206. In some examples, the electrodes can be formed from rows and columns of conductive material, and changes in the self-capacitance to ground of the rows and columns can be detected.

Computing system 300 can also include display device 330 comprising a display such as an LCD, for example, and host processor 328 (e.g., a tablet computer including a display and host processor). Host processor 328 can be configured for receiving outputs from panel processor 302 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 328 can also perform additional functions that may not be related to panel processing, and can be coupled to program storage 332 and display device 330 for providing a UI to a user of the computing device (e.g., tablet computer device).

Note that one or more of the functions described herein, including the calibration of touch nodes according to examples of the disclosure, can be performed by firmware stored in memory (e.g. one of the peripherals 304 in FIG. 3) and executed by panel processor 302, or stored in program storage 332 and executed by host processor 328. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

As described above, absorption changes can cause drift in fabric touch nodes. The capacitance of a touch node and a reference node can be expressed as a function of the area of the electrodes, the distance between the electrodes, and dielectric constants of free space and the fabric material separating the electrodes. For example, the capacitance can be expressed mathematically as in equation (1):

$$C = \varepsilon_0 \varepsilon_r \frac{A}{d} \qquad (1)$$

where C can represent capacitance between two electrodes at a touch node, A can represent an area of electrodes forming a capacitive touch node, d can represent the distance between the electrodes forming a capacitive touch node, $\varepsilon_0$ can represent an electric constant of free space and $\varepsilon_r$ can represent a dielectric constant of the fabric between the electrodes. When a fabric material absorbs moisture, a liquid, or chemical, the dielectric constant $\varepsilon_r$ can change. Water, for example, can increase the dielectric constant by a factor between 20 and 100 times the dielectric constant of a dry fabric, resulting in larger capacitance measurements. When the capacitance scales due to absorption drift, recalibration can be applied to reverse the scaling. The amount of scaling can be determined by comparing a touch node measurement (under a no-touch condition), which can scale due to changes in absorption drift, to a reference node which can be unscaled due to changes in absorption drift for touch nodes. It should be noted that one advantage of fabric touch and reference nodes can be minimal temperature drift of capacitance measurements, such that drift during operation can be primarily attributed to changes in absorption drift rather than temperature.

One or more reference nodes can be included in a keyboard such that the reference nodes can be isolated from changes in humidity or changes due to absorption of liquids or chemicals. For example, reference nodes can be located in the interior of a device, whereas the touch nodes can be located in or otherwise exposed to an external surface of a device and therefore susceptible to absorption. For example, as illustrated in FIGS. 1B and 1C, the reference node layer 108 can be on an interior of a device. In some examples, the reference nodes can be environmentally sealed from an external environment (e.g., waterproof or water-vapor proof) or hermetically sealed. Placing the reference nodes in the interior of a device can also provide isolation from the effects of touching or proximate objects. In some examples, the reference nodes can be relatively isolated compared with touch nodes (where reduced isolation can reduce performance because the likelihood of drift of the reference nodes can increase). In some examples, rather than an internal placement of the reference nodes, the one or more reference nodes can be on, or part of, an external surface of a device (e.g., in the same layer as the touch nodes), but the reference nodes can be isolated from absorption or touch by other means (e.g., isolation tape, etc.). In some examples, multiple reference nodes can be co-located for simplified manufacturing and assembly. In some examples, reference nodes can be located at different locations so that localized damage to a device can be absorbed without damaging the operation of all reference nodes.

Figure 4:
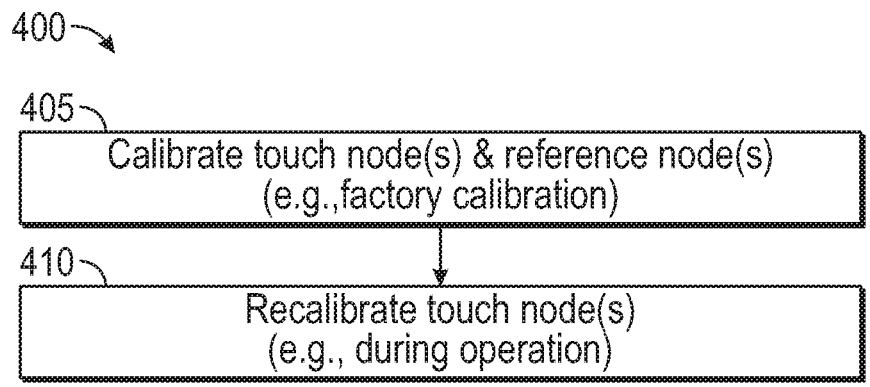
FIG. 4 illustrates an exemplary process for absorption correction of touch-sensitive input devices including a fabric touch-sensitive layer according to examples of the disclosure.

FIG. 4 illustrates an exemplary process 400 for absorption correction for touch-sensitive input devices including a fabric touch-sensitive layer according to examples of the disclosure. At 405, the touch-sensitive input device can be initially calibrated. The calibration can take place at the factory (or in another circumstance with controlled conditions, such as in a repair center) such that measurements of touch nodes and measurements of reference nodes can be under the same environmental conditions. For example, touch nodes and reference nodes can be sensed under known temperature and humidity conditions. Under ideal operating conditions, each touch node and reference node can have the same measurement. Calibration can normalize the output of the touch and reference nodes to account for differences in the measurements (e.g., due to part-to-part mismatch). In some examples, the calibration adjustments can be made by adjusting a gain for each sense channel and/or each touch or reference node. In some examples, the gain can be adjusted by adjusting the gain of amplifier in the input path of a sense channel. In some examples, the gain can be adjusted in post-processing of digital or analog measurements. In some example, the gain can be adjusted in both the input path of a sense channel and in post-processing of sense channel outputs.

Figures 6A, 6B, 6C:
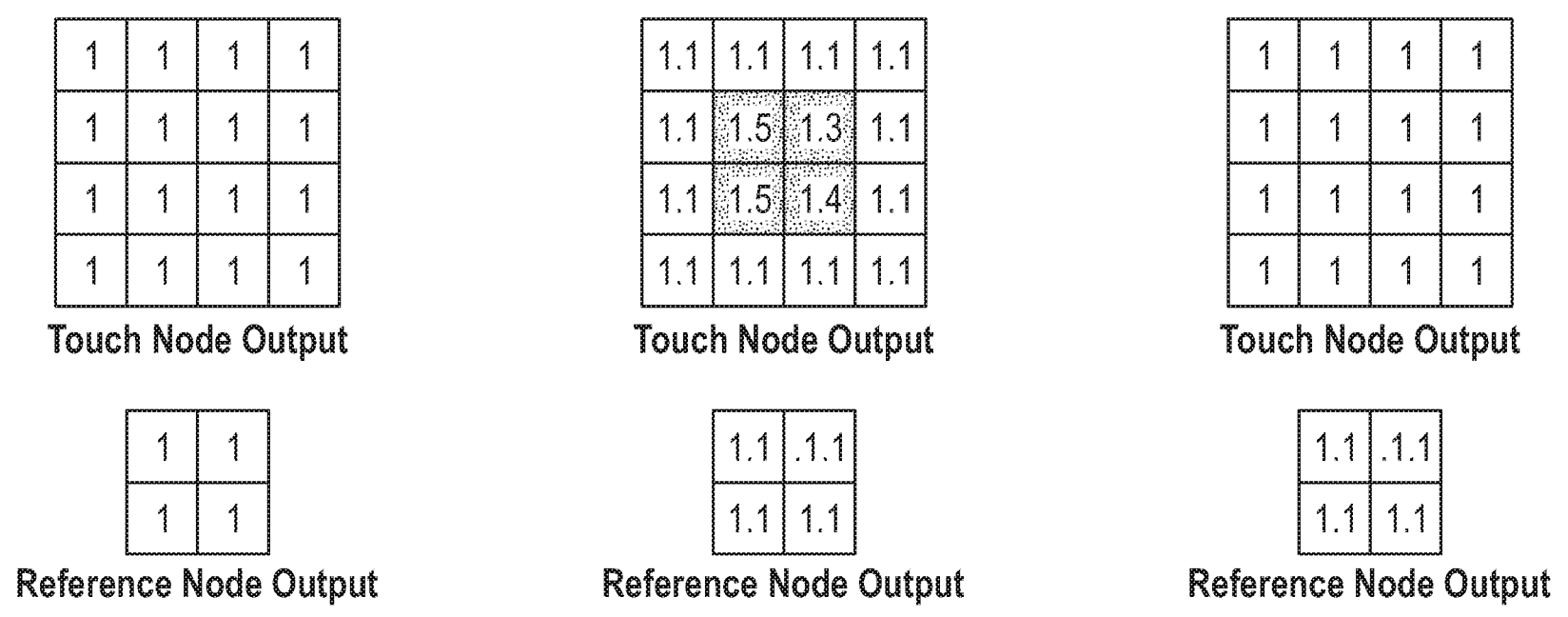

FIG. 6A illustrates an initial calibration process for touch nodes and reference nodes according to examples of the disclosure. Sixteen touch nodes (e.g., arranged in 4×4 array) and four reference nodes are illustrated. As a result of the calibration process at 405, the output of touch nodes and reference nodes can be the same value (or within a tolerance (e.g., 1%, 5%) of the same value) illustrated as a normalized value of 1.

At 410, during operation the device can be recalibrated to account for changes in humidity of the touch-sensitive fabric layer or absorption of liquids or chemicals. As discussed herein, touch (and/or proximity) sensing performance can be degraded by moisture, liquids or chemicals absorbed in the fabric touch-sensitive layer. The moisture, liquids or chemicals can, for example, change the dielectric constant of the fabric separating the row and column electrodes of the touch-sensitive layer, resulting in changes in the measured capacitance therebetween. Measurements of the reference nodes can be used to recalibrate touch nodes to account for this drift in capacitance. The recalibration, like the initial calibration, can be performed, for example, by adjusting the gain for sense channels of touch nodes at which absorption drift is measured and/or by post processing. The details of recalibration are explained below with reference to process 500.

Figure 5:
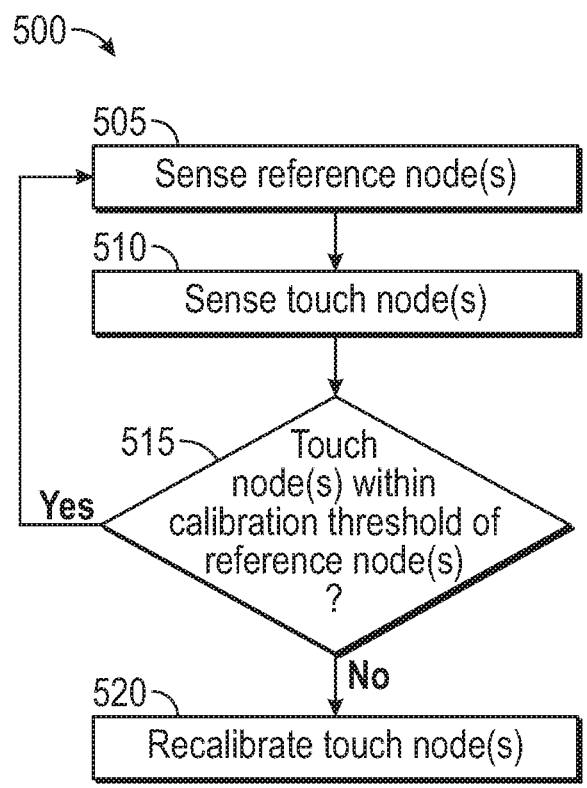
FIG. 5 illustrates an exemplary process for recalibrating a touch-sensitive input device including a fabric touch-sensitive layer according to examples of the disclosure.

FIG. 5 illustrates an exemplary process 500 for recalibrating touch-sensitive input devices including a fabric touch-sensitive layer according to examples of the disclosure. At 505, one or more reference nodes can be sensed (e.g., to measure a capacitance for the one or more reference nodes). The one or more reference node measurements can be used to determine a baseline for the system according to operating environmental conditions. At 510, one or more touch nodes can be sensed (e.g., to measure a capacitance for the one or more touch nodes). At 515, the one or more touch node measurements can be compared with the one or more reference node measurements, and the system can determine whether there is a difference between the one or more touch node measurements and the reference node measurements, and if so whether the difference exceeds a calibration threshold. If a touch node measurement is within the calibration threshold, the touch node does not need to be calibrated and the system returns to 505 for the next cycle of process 500. If a touch node measurement is not within the calibration threshold, the touch node is recalibrated at 520. Additionally, the touch nodes can be baselined (e.g., before 515 or after recalibration) to account for the global humidity drift across the fabric touch sensing layer due to changes in environmental humidity that can impact all the sensing nodes.

In some examples, process 500 can be performed continuously (e.g., for each touch sensing scan of the touch-sensitive surface). In some examples, to save power, the process 500 can be performed periodically rather than continuously (e.g., once every 30 seconds, once every 20 touch sensing scans). In some examples, process 500 can be performed under specific device conditions. For example, the device can include a humidity sensor indicative of the environmental conditions, and process 500 can be triggered by changes detected by the humidity sensor. In some examples, process 500 can be disabled when the device is powered off, enters a low power state, or when no touch is detected for a threshold period of time.

In some examples, recalibration of touch nodes can only occur when the measurements of the touch nodes at 510 correspond to a no-touch (or proximity) condition. For example, measurements of touch nodes can change due to an object touching or in proximity to the touch-sensitive layer, but such changes will not be replicated by reference nodes, which can be isolated from touches. As a result, the recalibration of 515 and 520 can be limited to instances when a no-touch (or proximity) condition is detected. In some examples, the no-touch condition can be detected by determining that none of the touch nodes exceed a touch (or proximity) threshold. In some examples, when the measurements of touch nodes are within a threshold amount (e.g., 10%, 25%, etc.) of the baseline no-touch measurement, a no-touch condition can be determined.

In some examples, recalibration can be performed for touch nodes and which no-touch is detected, and not performed for touch nodes at which touch is detected. For example, those touch nodes below a threshold amount of change (corresponding to a no-touch condition) can be compared to reference node(s) and recalibrated as necessary. Those touch nodes above a threshold amount of change (corresponding to a touch or hover condition) can forgo recalibration. In some examples, performing or not performing recalibration is applied on a regional basis rather than an individual touch node bases. For example, the touch-sensitive layer can be divided into multiple regions, each region including a plurality of touch nodes. Those regions under a no-touch condition can be recalibrated (as necessary), whereas those regions under a touch-condition can forgo recalibration.

The recalibration of process 500 can also be performed at a localized level, such that absorption changes that impact a subset of the touch nodes can be corrected for the subset of touch nodes. For example, when a drop of water falls on a keyboard and is absorbed by a fabric touch-sensitive layer near an "F" key, the touch nodes experiencing drift due to the water drop can be recalibrated and the rest of the touch nodes need not be recalibrated. This localization of absorption drift correction can be an improvement over drift correction applied panel-wide based on changes in humidity in the operating environment.

In some examples, only one reference node can be included and the one measurement is used for determining whether one or more touch nodes drift due to changes in absorption (e.g., at 515). In some examples, more than one reference node (four, ten, etc.) can be used to make the absorption drift correction more robust. For example, the multiple reference nodes can be measured and the multiple measurements can be averaged. The average of the multiple reference nodes can be used as the reference measurement and the difference between a touch node and this reference measurement can be compared with the calibration threshold to determine whether and by how much to recalibrate touch nodes. Under ideal conditions each of the multiple reference nodes should have the same measurement and thus the average should be the same as each individual sensor measurement. In some examples, outlier reference node measurements can be excluded before taking the average. For example, if a subset of the reference nodes diverges a threshold amount from the remaining reference nodes or from the initial calibration measurement for the subset of reference nodes, the subset of reference nodes can be excluded. For example, divergence of a threshold amount (10%, 25%, etc.) can indicate that the reference node is not operating properly. Thus, this reference node can be excluded to avoid incorrect recalibration. In some examples, once a reference node is identified as an outlier it can be excluded permanently. In some examples, the outlier reference node can be excluded temporarily until its measurements are no longer outlier measurements. Although an arithmetic average is described above, in other examples, the reference measurement (e.g., calibration threshold) can be based on other processing of the multiple reference node measurements. For example, a weighted average could be used to minimize the impact of outlier reference node measurements. In some examples, a mode of the reference measurements can be used rather than an average.

FIGS. 6B and 6C illustrate a recalibration process for touch nodes and reference nodes according to examples of the disclosure. Sixteen touch nodes (e.g., arranged in a 4×4 array) and four reference nodes are illustrated. FIG. 6B illustrates the resulting measurements at 505 and 510 of process 500. The reference nodes, for example, can be measured at 1.1, which is a deviation from the calibration normalized value of 1. The deviation can be due to the changes in environmental conditions from the controlled initial calibration conditions (e.g., change in humidity). As illustrated in FIG. 6B, many of the touch nodes can also be measured at 1.1 for the same reason (e.g., global humidity changes). However, some of the touch nodes can be measured at other values (e.g., 1.3, 1.4, 1.5) different than the reference nodes. These touch node measurements can be the result of localized humidity changes (e.g., due to a liquid or chemical). FIG. 6C illustrates the result of the recalibration. The output of touch nodes can be recalibrated such that the outputs of the touch nodes can be the same value (or within a tolerance of the same value) illustrated as a normalized value of 1. Recalibrating the touch nodes can increase the dynamic range available for measurements in some examples. In some examples, rather than recalibrating all of the touch nodes, the touch node outputs departing from the reference node output can be recalibrated and the remaining touch node output can remain without calibration. As a result, the touch node output can be 1.1 for all touch nodes, for example. In some examples, a baselining step can be used to normalize the output for global humidity changes and process 500 can be used to calibrate touch nodes for localized absorption changes in touch nodes. In some examples, baselining can be performed before determining whether recalibration is required at 515. For example, the change in reference node output (e.g., 0.1) can be subtracted from the touch node output, such that the shaded touch nodes in FIG. 6B can be different than 1 and can be recalibrated, whereas the non-shaded touch nodes can be 1 and therefore not require recalibration.

Process 500 can require similar behavior from touch nodes and reference nodes for proper operation. In some examples, the touch nodes and reference nodes can be formed from the same materials. In such examples, the fabric material and electrodes of the touch nodes and reference nodes can be the same. In some examples, the materials can be different but have the same or similar electrical properties. For example, a different fabric or different conductor can be used if the electrical properties result in similar measured capacitances and absorption drift response.

Therefore, according to the above, some examples of the disclosure are directed to an electronic device. The electronic device can comprise: a first fabric layer including one or more touch nodes, one or more reference nodes, and processing circuitry coupled to the one or more touch nodes and the one or more reference nodes. The processing circuitry can be capable of: sensing the one or more reference nodes; sensing the one or more touch nodes; detecting a drift in a touch node measurement of at least one of the one or more touch nodes based on measurements of the one or more reference nodes; and in accordance with detecting the drift in the touch node measurement of the at least one of the one or more touch nodes, adjusting the touch node measurement of the at least one of the one or more touch nodes in accordance with the measurements of the one or more reference nodes. Additionally or alternatively to one or more of the examples disclosed above, in some examples, the electronic device can further comprise a plurality of keyboard keys. The first fabric layer can overlap the keyboard keys. Additionally or alternatively to one or more of the examples disclosed above, in some examples, the electronic device can further comprise keycaps disposed over the first fabric layer in positions corresponding to the plurality of keyboard keys. Additionally or alternatively to one or more of the examples disclosed above, in some examples, the first fabric layer can include an array of row electrodes and column electrodes. Each of the one or more touch nodes can be formed at an adjacency of one of the row electrodes and one of the column electrodes separated by a portion of the first fabric layer. Additionally or alternatively to one or more of the examples disclosed above, in some examples, the one or more reference nodes can be formed in a second fabric layer. Additionally or alternatively to one or more of the examples disclosed above, in some examples, the first fabric layer and the second fabric layer can be formed from a common fabric. Additionally or alternatively to one or more of the examples disclosed above, in some examples, the first fabric layer can be formed from a different fabric than the second fabric layer. Additionally or alternatively to one or more of the examples disclosed above, in some examples, changes in a dielectric property of the first fabric due to changes in absorption can be within a threshold amount of changes in a dielectric property of the second fabric due to changes in absorption. Additionally or alternatively to one or more of the examples disclosed above, in some examples, the second fabric layer can include an array of row electrodes and column electrodes. Each of the one or more reference nodes can be formed at an adjacency of one of the row electrodes and one of the column electrodes separated by a portion of the second fabric layer. Additionally or alternatively to one or more of the examples disclosed above, in some examples, the electronic device can further comprise a plurality of keyboard keys disposed on a support surface and a frame. The second fabric layer can be disposed between the support surface and the frame. Additionally or alternatively to one or more of the examples disclosed above, in some examples, the one or more reference nodes can be formed in the first fabric layer and isolated from absorption of liquids and from changes in capacitance due to objects touching or in proximity to the one or more reference nodes. Additionally or alternatively to one or more of the examples disclosed above, in some examples, the processing circuitry can comprise one or more sense channels. The processing circuitry can be further capable of adjusting a gain of at least one of the one or more sense channels corresponding to the at least one of the one or more touch nodes to adjust the touch node measurements. Additionally or alternatively to one or more of the examples disclosed above, in some examples, adjusting the touch node measurement of the at least one of the one or more touch nodes can comprise scaling a value of the touch node measurement. Additionally or alternatively to one or more of the examples disclosed above, in some examples, the one or more reference nodes can comprise a plurality of reference nodes and adjusting the touch node measurement can be based on an average of measurements of the plurality of reference nodes.

Some examples of the disclosure are directed to a method. The method can comprise sensing one or more reference nodes, sensing one or more touch nodes formed in a fabric, detecting a drift in a touch node measurement of at least one of the one or more touch nodes based on measurements of the one or more reference nodes, and in accordance with detecting the drift in the touch node measurement of the at least one of the one or more touch nodes, adjusting the touch node measurement of the at least one of the one or more touch nodes in accordance with the measurements of the one or more reference nodes. Additionally or alternatively to one or more of the examples disclosed above, in some examples, the method can further comprise: in accordance with detecting no drift in a touch node measurement of at least a second of the one or more touch nodes based on the measurements of the one or more reference nodes, forgoing adjusting the touch node measurement of the least the second of the one or more touch nodes. Additionally or alternatively to one or more of the examples disclosed above, in some examples, the one or more reference nodes can comprise a plurality of reference nodes. The method can further comprise: averaging the measurements of the plurality of reference nodes. Additionally or alternatively to one or more of the examples disclosed above, in some examples, the method can further comprise: excluding at least one measurement of one of the plurality of reference nodes which exhibits more than a threshold amount of drift. Additionally or alternatively to one or more of the examples disclosed above, in some examples, the method can further comprise: baselining the touch node measurements of the one or more touch nodes based on the measurements of the one or more reference nodes. Some examples of the disclosure are directed to a non-transitory computer readable storage medium. The non-transitory computer readable storage medium can store instructions, which when executed by one or more processors of an electronic device, the electronic device including a first fabric layer including one or more touch nodes and one or more reference nodes, can cause the one or more processors to perform any of the above methods.

Some examples of the disclosure are directed to an input device. The input device can comprise a first fabric layer including one or more touch nodes and a second fabric layer, separate from the first fabric layer, including one or more reference nodes. At least a portion of the first fabric layer can form at least a portion of an external surface of the input device. The second fabric layer can be disposed within the input device. Additionally or alternatively to one or more of the examples disclosed above, in some examples, the first fabric layer and the second fabric layer can be formed from a same type of fabric. Additionally or alternatively to one or more of the examples disclosed above, in some examples, the first fabric layer can be formed from a different type of fabric than the second fabric layer. Additionally or alternatively to one or more of the examples disclosed above, in some examples, changes in a dielectric property of the first fabric due to changes in absorption can be within a threshold amount of changes in a dielectric property of the second fabric due to changes in absorption. Additionally or alternatively to one or more of the examples disclosed above, in some examples, the input device can further comprise a plurality of keyboard keys. The first fabric layer can overlap the keyboard keys. Additionally or alternatively to one or more of the examples disclosed above, in some examples, the input device can further comprising keycaps disposed over the first fabric layer in positions corresponding to the plurality of keyboard keys.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device comprising:
a first fabric layer including one or more touch nodes;
a second fabric layer including one or more reference nodes; and
processing circuitry coupled to the one or more touch nodes and the one or more reference nodes, the processing circuitry configured to:
sense the one or more reference nodes;
sense the one or more touch nodes;
detect a drift in a touch node measurement of at least one of the one or more touch nodes based on measurements of the one or more reference nodes; and
in accordance with detecting the drift in the touch node measurement of the at least one of the one or more touch nodes, adjust the touch node measurement of the at least one of the one or more touch nodes in accordance with the measurements of the one or more reference nodes.

2. The electronic device of claim 1, further comprising:
a plurality of keyboard keys, wherein the first fabric layer overlaps the keyboard keys.

3. The electronic device of claim 2, further comprising keycaps disposed over the first fabric layer in positions corresponding to the plurality of keyboard keys.

4. The electronic device of claim 2, further comprising:
a plurality of keyboard keys disposed on a support surface; and
a frame;
wherein the second fabric layer is disposed between the support surface and the frame.

5. The electronic device of claim 1, wherein the first fabric layer is formed from a different fabric than the second fabric layer.

6. The electronic device of claim 5, wherein changes in a dielectric property of the first fabric due to changes in absorption are within a threshold amount of changes in a dielectric property of the second fabric due to changes in absorption.

7. The electronic device of claim 1, wherein the first fabric layer includes an array of row electrodes and column electrodes, and each of the one or more touch nodes is formed at an adjacency of one of the row electrodes and one of the column electrodes separated by a portion of the first fabric layer.

8. The electronic device of claim 1, wherein the first fabric layer and the second fabric layer are formed from a common fabric.

9. The electronic device of claim 1, wherein the second fabric layer includes an array of row electrodes and column electrodes, and each of the one or more reference nodes is formed at an adjacency of one of the row electrodes and one of the column electrodes separated by a portion of the second fabric layer.

10. The electronic device of claim 1, wherein the one or more reference nodes are formed in the first fabric layer and isolated from absorption of liquids and from changes in capacitance due to objects touching or in proximity to the one or more reference nodes.

11. The electronic device of claim 1, wherein the processing circuitry comprises one or more sense channels and the processing circuitry is further configured to adjust a gain of at least one of the one or more sense channels corresponding to the at least one of the one or more touch nodes to adjust the touch node measurements.

12. The electronic device of claim 1, wherein adjusting the touch node measurement of the at least one of the one or more touch nodes comprises scaling a value of the touch node measurement.

13. The electronic device of claim 1, wherein the one or more reference nodes comprises a plurality of reference nodes and adjusting the touch node measurement is based on an average of measurements of the plurality of reference nodes.

14. The electronic device of claim 1, further comprising:
a layer between the first fabric layer and the second fabric layer.

15. A method comprising:
sensing one or more touch nodes formed in a first fabric layer;
sensing one or more reference nodes formed in a second fabric layer;
detecting a drift in a touch node measurement of at least one of the one or more touch nodes based on measurements of the one or more reference nodes; and
in accordance with detecting the drift in the touch node measurement of the at least one of the one or more touch nodes, adjusting the touch node measurement of the at least one of the one or more touch nodes in accordance with the measurements of the one or more reference nodes.

16. The method of claim 15, wherein the one or more reference nodes comprises a plurality of reference nodes, the method further comprising:
averaging the measurements of the plurality of reference nodes.

17. The method of claim 16, the method further comprising:
excluding at least one measurement of one of the plurality of reference nodes which exhibits more than a threshold amount of drift.

18. The method of claim 15, further comprising:
in accordance with detecting no drift in a touch node measurement of at least a second of the one or more touch nodes based on the measurements of the one or more reference nodes, forgoing adjusting the touch node measurement of the least the second of the one or more touch nodes.

19. The method of claim 15, the method further comprising:
baselining the touch node measurements of the one or more touch nodes based on the measurements of the one or more reference nodes.

20. A non-transitory computer readable storage medium storing instructions, which when executed by one or more processors of an electronic device including a first fabric layer including one or more touch nodes and a second fabric layer including one or more reference nodes, cause the one or more processors to:
sense the one or more touch nodes;
sense the one or more reference nodes;
detect a drift in a touch node measurement of at least one of the one or more touch nodes based on measurements of the one or more reference nodes; and
in accordance with detecting the drift in the touch node measurement of the at least one of the one or more touch nodes, adjust the touch node measurement of the at least one of the one or more touch nodes in accordance with the measurements of the one or more reference nodes.

21. The non-transitory computer readable storage medium of claim 20, wherein the one or more reference nodes comprises a plurality of reference nodes, the instructions when executed further cause the one or more processors to:
average the measurements of the plurality of reference nodes.

22. The non-transitory computer readable storage medium of claim 21, the instructions when executed further cause the one or more processors to:
exclude at least one measurement of one of the plurality of reference nodes which exhibits more than a threshold amount of drift.

23. The non-transitory computer readable storage medium of claim 20, the instruction when executed further cause the one or more processors to:
in accordance with detecting no drift in a touch node measurement of at least a second of the one or more touch nodes based on the measurements of the one or more reference nodes, forgo adjusting the touch node measurement of the least the second of the one or more touch nodes.

24. The non-transitory computer readable storage medium of claim 20, the instructions when executed further cause the one or more processors to:
baseline the touch node measurements of the one or more touch nodes based on the measurements of the one or more reference nodes.

* * * * *